(12) United States Patent
Corvari

(10) Patent No.: US 11,858,542 B2
(45) Date of Patent: Jan. 2, 2024

(54) END OF TRAIN DEVICE AND METHODS FOR POWERING END OF TRAIN DEVICE

(71) Applicant: Meteorcomm, LLC, Renton, WA (US)

(72) Inventor: Lawrence J. Corvari, Normandy Park, WA (US)

(73) Assignee: Meteorcomm, LLC, Renton, WA (US)

( * ) Notice: Subject to any disclaimer, the term of this patent is extended or adjusted under 35 U.S.C. 154(b) by 0 days.

(21) Appl. No.: 17/561,259

(22) Filed: Dec. 23, 2021

(65) Prior Publication Data

US 2022/0194443 A1    Jun. 23, 2022

Related U.S. Application Data

(60) Provisional application No. 63/130,382, filed on Dec. 23, 2020.

(51) Int. Cl.
*B61L 15/00* (2006.01)
*H02K 7/10* (2006.01)
*H02J 7/14* (2006.01)

(52) U.S. Cl.
CPC ............ *B61L 15/0054* (2013.01); *H02J 7/14* (2013.01); *H02K 7/1004* (2013.01)

(58) Field of Classification Search
CPC .................................................. B61L 15/0054
See application file for complete search history.

(56) References Cited

U.S. PATENT DOCUMENTS

| | | | |
|---|---|---|---|
| 2004/0216636 A1* | 11/2004 | Emori | B60L 50/30 105/49 |
| 2007/0272116 A1* | 11/2007 | Bartley | B61C 7/04 903/903 |
| 2013/0184905 A1* | 7/2013 | Hatanaka | B60W 10/08 701/19 |
| 2015/0014991 A1* | 1/2015 | Al Jaeedi | B60L 50/15 290/50 |
| 2016/0043610 A1* | 2/2016 | King | B60L 1/02 290/3 |
| 2018/0264951 A1* | 9/2018 | Kooi | B60L 50/90 |
| 2019/0366998 A1* | 12/2019 | Bolte | B60T 13/665 |

* cited by examiner

*Primary Examiner* — Daniel Kessie
(74) *Attorney, Agent, or Firm* — Hubbard Law, PLLC; Marc A. Hubbatd

(57) ABSTRACT

An end-of-train (EOT) unit that comprises an enclosure housing its monitoring, control, and communication equipment and systems, an arm that positions and supports at least one auxiliary wheel on a rail of a track to rotate electrical generator coupled to the auxiliary wheel while the train is moving.

20 Claims, 2 Drawing Sheets

END OF TRAIN DEVICE AND METHODS FOR POWERING END OF TRAIN DEVICE

RELATED APPLICATION

This application claims the benefit of U.S. provisional application 63/130,382, filed Dec. 23, 2020, which is incorporated by reference herein for all purposes.

FIELD OF INVENTION

The disclosure pertains to end of train devices and power generation to operate end of train devices.

BACKGROUND

The following disclosure describes improvements to EOT units. Each of improvements may be used independently of the other or in combination with any one or more of the other improvements.

Modern railway operations, particularly those of class I freight railroads with long trains, require various electronic devices used for monitoring, signaling, and controlling trains and devices located on trains. One such device is an "end of train" (EOT) unit or device. An EOT unit is attached to the rear of the last car of a train.

Initially, EOT units were relatively simple devices with a signal light for the end of the train. However, EOT units have evolved to handle more functions and are now required by regulation on trains that go over 30 miles per hour and operate on heavy grades. EOT units now include additional equipment or components that monitor or interoperate with one or more subsystems on the train and perform signaling and communication functions. One of the functions of modern EOT units is to monitor the train's braking system pressure at the last car and report it or a loss of pressure to the head of train. If there is adequate pressure at the last car in the train, the cars in front of it will have adequate pressure. Another function of an EOT is to provide emergency braking control to the rear section of a train. EOT units are capable of receiving an emergency braking signal from a head of train device. EOTs may also, for example, include GPS (Global Positioning System) or other components for detecting geolocation to identify the end of train, train movement, and train speed.

A HOT unit is comprised of one or more devices or systems located at the head of the train that communicates with an EOT unit and, in turn, communicates with various subsystems on the train. The locomotive at the head of the train will include computers and other circuits that are used to control the operation of the train and its various subsystems, including the braking subsystem, as well as radios that communicate over wireless networks for train control.

To communicate with the HOT unit, an EOT unit also typically includes a radio for transmitting and receiving wireless signals to and from the head of the train and/or with other onboard radios connected with the train's control systems. A radio is preferred to a wired network for communicating with the HOT unit. However, an EOT may, optionally, be connected to a wired network onboard the train.

Because the final car in a train may change at any point in a trip, the EOT needs to be relatively easily and quickly removed by train personnel and attached to the new final car. All the equipment of an EOT unit is therefore housed in a unitary enclosure that facilitates attachment and removal, protects the equipment, and discourages unauthorized access to the equipment. An EOT unit is also adapted or configured to be attached to a rear-facing side or end of most train cars, for example, to the coupler used to connect it to other cars. External hoses and cables are used to connect it to the train car's pneumatic brake system and other systems.

To power equipment, modern EOT units contain not only one or more batteries but also an electric generator that is driven by the turbine-powered by a train's pneumatic brake pressure system, which it is also monitoring.

SUMMARY

The following disclosure describes improvements to EOT units. Each improvement may be used independently of the other or in combination with any one or more of the other improvements.

Because the pneumatic pressure in the brake system must be maintained at a certain level to provide braking functions, there is a limit to how much of it can be used to drive the turbine of an electric generator. Current turbine-driven electric generators are not capable of generating as much power as is needed for increasingly sophisticated electronic equipment that is or could be housed within an EOT unit. This means that its batteries will drain even while they are being recharged. Increasing the size of the batteries to hold more power might be enough to power the electronic components for longer distances. However, the batteries will eventually need to be recharged externally, thus creating logistical and potential safety issues.

Described below is an improved EOT unit that comprises an enclosure housing its monitoring, control, and communication equipment and systems, an electrical generator or alternator (collectively "generator") with an electrical output coupled with a power supply and storage system in the housing and an input rotationally coupled to at least one auxiliary wheel and an arm for supporting and positioning the auxiliary wheel on a rail of a track for rotation by the movement of the train car. When the train moves, the wheel rotates the electrical generator, thus producing a current that is carried to the housing to charge one or more batteries or, optionally, to directly power any one or more of the electrical components in the housing of the EOT unit. The generator is capable of producing at least as much power as the EOT unit's equipment consume when in use. The arm may be attached directly to a train car or to the housing for the EOT unit.

In another representative embodiment, an EOT unit comprises at least one arm supporting at least one auxiliary wheel that drives a generator when rotated. The arm positions the auxiliary on the rail and functions to maintain sufficient contact between the auxiliary wheel and the rail to operate the electric generator. Optionally, the arm positions a transverse member that supports two auxiliary wheels, one on each track, and a generator with an input driven by at least one of the two auxiliary wheels.

DETAILED DESCRIPTION OF EXEMPLARY EMBODIMENTS

In the following description, like numbers refer to like elements.

Figure 1:
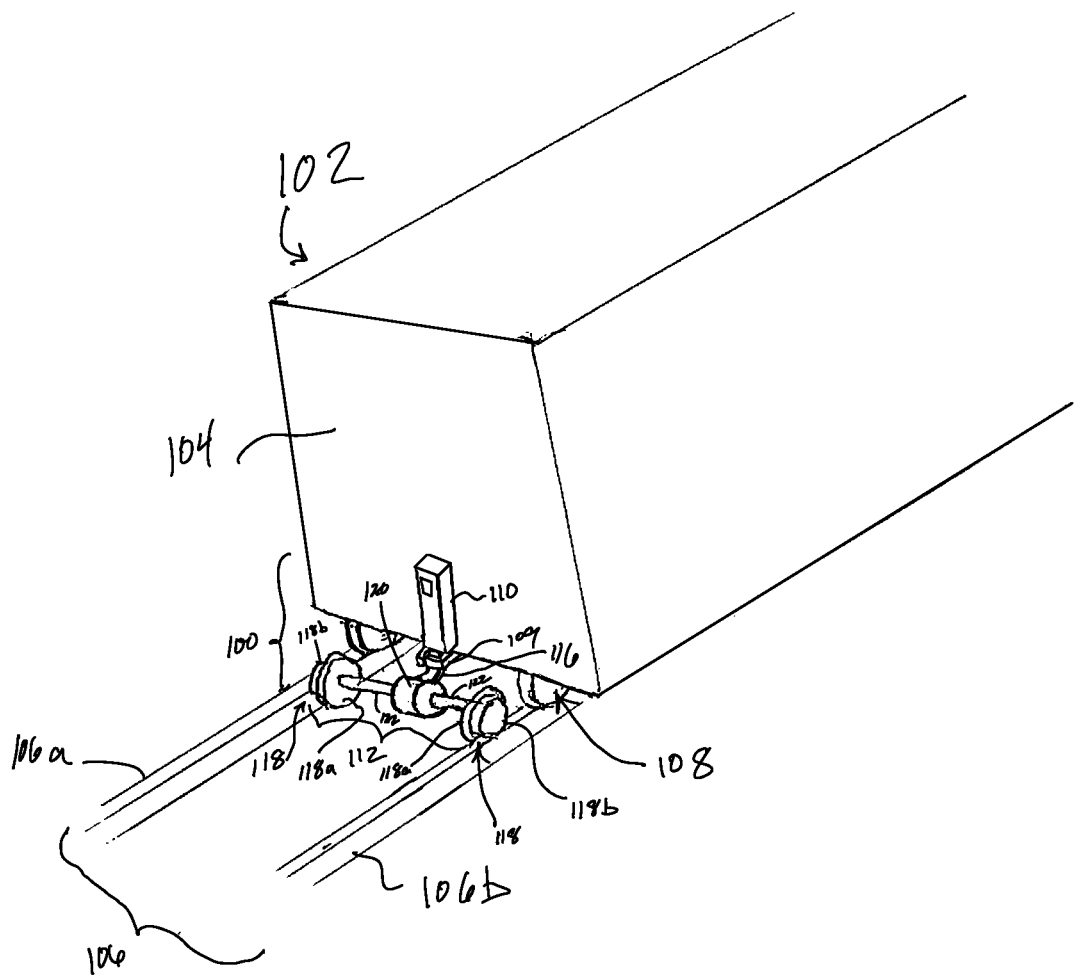
FIG. 1 is a schematical illustration of a representative example of one embodiment of an EOT unit affixed to a boxcar, in which the EOT unit comprises a generation subassembly with two auxiliary wheels.
Figure 2:
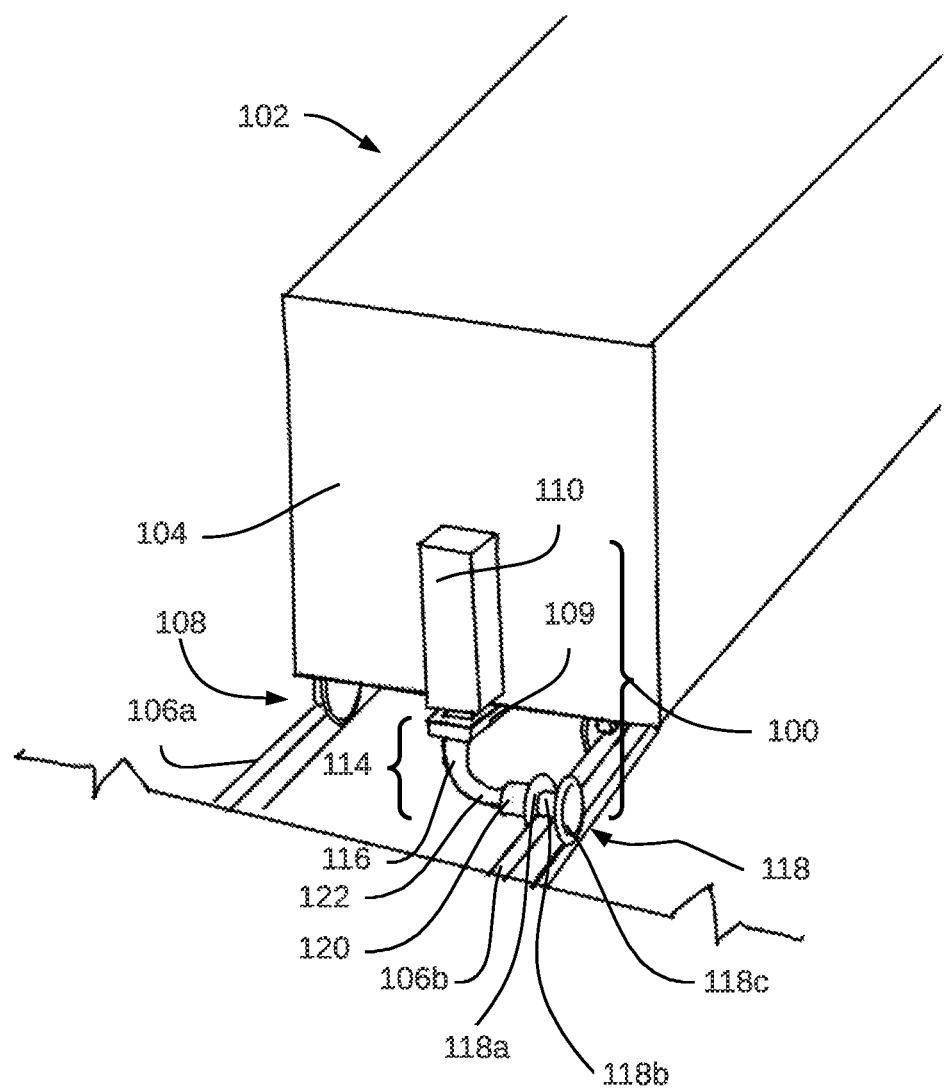
FIG. 2 schematically illustrates a second embodiment of an EOT unit affixed to a boxcar, in which the EOT unit is comprised of an electric generation subassembly with one auxiliary wheel positioned by a support arm to contact one of two rails of a railroad track.

FIGS. 1 and 2 each depict a representative example of an embodiment of an EOT unit 100 attached to a train car 102. EOT unit 100, which is an integrated assembly that is configured to be attached to a rear-facing end 104 of a train's last car 102. In the illustrated example, car 102 is a boxcar. However, a boxcar is a non-limiting, representative example of a train car to which an EOT unit may be attached. The car 102 is supported on a track 106 by an undercarriage 108. The track is comprised of at least two rails, rail 106a and rail 106b.

The EOT unit 100 comprises at least two primary subassemblies. One primary subassembly is comprised of the unit's electronic and electrical components and sensors, which are housed in a protective enclosure 110. Representative examples of such components are a power supply, which includes a power storage device such as one or more rechargeable batteries, and any one or more of the following: sensors for monitoring conditions of subsystems for a train, such as its braking system; a global positioning satellite (GPS) receiver for determining the location of the end of the train and the EOT unit; lights built into the enclosure and controlled by internal circuits for visually indicating the end of the train; one or more two-way radios for communication with the HOT and, optionally, over a wireless train control network such as the ITCnet® network operated by Meteorcomm, LLC; and hardware for performing control, communication, and data processing processes, such as field programmable gate arrays (FPGA), microcontrollers, and/or general purpose processors or computers that executed stored instructions or software.

Each EOT unit 100 further comprises an electric generation subassembly. Two embodiments of the electric generation subassembly are shown, one on FIG. 1 and one in FIG. 2. Each is a non-limiting, representative example of an electric generation subassembly. Electric generation subassembly 112 in FIG. 1 will be referred to as a "balanced" electric generation subassembly because it rides on both rails 106a and 106b. Electric generation subassembly 114 in FIG. 2 engages either rail 106a or 106b, but not both.

Each electric generation subassembly 112 and 114 is comprised of a support arm 116 that removably couples, directly or indirectly, the subassembly with the car 102. Each electric generation subassembly further comprises at least one rotational member 118 in contact with one of the rails 106a or 106b. At least one rotational member 118 is coupled with at least one electrical generator 120 through a drive system (not shown). The electrical generator 120 could, instead, be an alternator. The term "generator" is intended to refer to any device capable of generating from a rotational input direct or alternating electrical current. The support arm 116 is representative of a structure that mechanically couples the electric generation subassembly 112 or 114 to the rear end 104 of the car 102 and supports the subassembly in a position in which each rotational member 118 engages and rolls along or is otherwise rotated by a rail of track 106 when the car 102 moves on the track. Each rotational member 118 is mounted on a transverse support member 122 for rotation about a horizontal axis.

The EOT unit 100 is an assembly configured for repeated attachment and detachment to the rear end of a car so that it can be switched to whatever car is the last car in the train or stored for later use. For example, a mounting system for an EOT unit may include an adapter that enables it to be attached or clamped to a train car coupler 109 that is present on all train cars and used to connect them together to form the train. Alternatively, the mounting system of the EOT unit may include an adapter or bracket that is designed to mount to another component of the car, such as its frame (not shown) or to a bracket or coupling that has been fitted or attached to the rear-facing end 104 of the car 102. The mounting system may allow each subassembly to be connected separately to car 102. The mounting system may, alternatively, connect the enclosure 110 to the car and the electric generation subassembly 112 or 114 to the enclosure. In another alternative embodiment, the mounting system may connect the support arm 116 to the car, with the enclosure 110 mounted to or supported by the electric generation subassembly. For example, the mounting system may allow the support arm 116 to be connected to a train coupler 109, the enclosure 110 to be connected to the coupler, or both to be connected As the train, and therefore, car 102 moves forward along track 106, friction between rotational members 118 and rails 106a or 106b causes the rotational member 118 to rotate. Each rotational member is mounted to the subassembly in a manner that allows it to rotate.

To ensure that the area of contact between at least one rotational member 118 on electric generation subassembly 112 and the rotational member 118 on subassembly 114 is sufficient to cause the rotational member to be rotated on the subassembly by engagement with a rail 106a or 160b and, in turn, rotate the input of the electrical generator 120, the rotational member may have a configuration (a shape and size) that complements the cross-sectional shape of the rail 106a or 106b and acts to maintain its position on the rail. The rotational member may also have at least some of its surfaces that contact the rail (particularly surfaces that contact a top surface of a rail), if not the entire rotational member, made from or comprise a material that has, as compared to being made from the same material of which the rail is made, a higher coefficient of friction and/or that include surface features that promote traction of the rotational member on the rail. For example, a rotational member may be made partially or entirely of rubber or composite material.

One or more of the rotational members 118 may, optionally, be configured in a way that assists with maintaining contact with the rail, such as with a means for retaining the rotational member on the rail. Each of the rotational members 118 that is shown in FIGS. 1 and 2 comprises an inner flange 118a and a hub 118b that engages a top surface of one of the rails 106a and 106b. In the balanced embodiment of FIG. 1, the transverse support member 122 extends the full width of track 106 and thus maintains a fixed distance between inner flanges 118a, the inner flanges 118a cooperating to keep the electric generation subassembly centered on track 106, which in turn ensures that hub 118b of the rotational members 118 remain in contact with the top surface of each of the rails 106a and 106b.

The single rotational member 118 in FIG. 2 further comprises an outer flange 118c that connects to hub 118b. The inner flange 118a and outer flange 118c cooperate to retain the rotational member 118 on rails 106a or 106b of track 106. This embodiment of a rotational member may, optionally, be used with the electric generation subassembly 112 of FIG. 1.

The support arm 116 in each embodiment of the electric generation subassembly 112 and 114 may be comprised of multiple elements. Furthermore, the support arm may, optionally, be adjustable to allow it to position the rotational member adjacent to be in contact with a rail after it has been attached to car 102 and/or to orient the axis of rotation of the rotational member with respect to the rail so that it is rotated by the rail when the train is moving. For example, the support structure may comprise one or more linkages comprised of links with joints that pivot or rotate and/or translate to allow for adjustment.

Furthermore, the supporting arm 116 for each electric generation subassembly 112 and 114 may, optionally, incorporate a suspension system that accommodates limited amounts of deflection or displacement of one or more of the rotation members 118 with respect to where the subassembly is connected with car 102 or EOT unit. In response to a displacement or deflection, the suspension will generate a return force. The suspension system may comprise one or more springs and dampers.

In one example, the support arm 116 of either or both electric generation subassemblies may be coupled to car 102 and/or to a transverse structural support member 122 in a manner that allows it to pivot up and down (or rotate about the horizontal axis) and/or in a manner that allows it to pivot, rotate or swing about a vertical axis. It may be allowed to swing freely up or down. Alternatively, a damper may optionally be included to slow its motion; and a spring may optionally be included to resist movement and supply a return force. Furthermore, the arm may, optionally, be configured with a spring that is loaded to generate a force between a point in a fixed relationship with the car 102 and the rotational member 118 when it is engaging one of the rails 106a or 106b, and thereby resulting in force applied to the rotational member that pushes it against the rail. If coupled to the car in a manner to allow it to pivot up and down, it may, optionally, be raised into a position in which it does not contact rails. It may also be raised to a fully stowed position to reduce the overall size of the EOT unit.

The support arm may, optionally, also be configured to load the rotational member 118 when it engages a rail of a track. Loading of a rotational member 118 to generate a force normal to the top surface of a rail can be accomplished by allowing some or all the mass of some or all of the electric generation subassembly to rest on the rails, such as by mounting to the car 102 that allows for the subassembly to shift up and down with respect to the car 102. Alternatively, or in addition, one or more springs coupled into the support arm 116 between a rotational member 118 and the car 102 could be loaded (for example, compressed or extended to generate a force) when the electric generation subassembly is mounted to the car 102, and the rotational member is placed in a neutral operating position on one of the rails 106a or 106b. The loading could generate a force that pushes the rotational member downwardly to engage the top surface of the rail and/or laterally against the side of the rail. In electric generation subassembly 114 of FIG. 2, lateral loading of the rotational member could be used to retain the position of the rotational member on the rail as an alternative to a rotational member with a disk-shaped outer flange portion like the outer flange 118c.

At least one of the two rotational embers of electric generation subassembly 112 (FIG. 1) and the rotational member of the generation subassembly 114 (FIG. 2) is coupled to an input shaft of electrical generator 120 by a drive assembly. Turning a rotational member 118 turns or drives the input shaft of the electrical generator 120. For example, one or both rotational members 118 of electric generation subassembly 112 (FIG. 1) could be attached to a drive axle, which rotates inside of an axle housing that comprises part of or the entire transverse support member 122. The drive axle is then coupled with an input shaft of the electrical generator 120 by a transmission comprising meshing gears, belts, and/or chains. Similarly, the single rotational member 118 of electric generation subassembly 114 (FIG. 2) could be attached to a drive axle disposed for rotation within a transverse portion 124 of the support arm 116, which then drives the input shaft of the electrical generator 120. Alternatively, the rotational members could rotate on a spindle at the end of the transverse support member 122 or transversion portion 124, and the input of the electrical generator input shaft is coupled directly to one of the rotational members 118 through gears, belts, and/or chains.

In any of the embodiments described herein, the electrical current generated by generator 120 and supplied to EOT enclosure 110 by an electrical cable (not shown) running from the electrical generator 120 to a power supply within EOT enclosure 110. The cable may be an external cable or a cable that runs within the structure of the support arm 116. Electrical current from the electrical generator is, for example, used by the power supply to charge a rechargeable battery and to power directly the electrical components. If electrical power is not required, any of the embodiments described herein may, optionally, include a transmission that disconnects the electrical generator from the rotational members 118. The amount of energy generated over a given distance of travel of a train is, in one embodiment, equal to or greater than the amount of energy required by or consumed by operation of the electronic components of EOT device over that distance. In another embodiment, the electrical generator is capable of generating at least 100 watts of power. In another embodiment, the electrical generator is capable of generating at least 100 watts of power when the train is moving at an average speed for a trip; or, alternatively, when the train is moving at least 40 MPH; or, alternatively, when the train is moving at least at 20 MPH; or, alternatively, when the train is moving at 10 MPH.

The foregoing description is of exemplary and preferred embodiments. The invention, as defined by the appended claims, is not limited to the described embodiments. The embodiments are, unless otherwise noted, non-limiting examples of one or more inventive features. Alterations and modifications to the disclosed embodiments may be made without departing from the invention. The meaning of the terms used in this specification are, unless stated otherwise, intended to have their ordinary and customary meaning to those in the art and are not intended to be limited to specific implementations that may be described.

What is claimed is:

1. An end of train (EOT) device comprising:
   an enclosure in which end of train electronic components are housed, the electronic components including at least one train monitoring system, a wireless communication device enabling the end of train device to send information wirelessly to a head of train device, and at least one battery for powering the at least the electronic components, the enclosure being configured for attachment to a rear end of a railroad car; and
   a subassembly comprising a support arm, an electrical generator, and at least one rotational member coupled to an input of the electrical generator to rotate the electrical generator when the at least one rotational member is rotated and thereby generate an electrical current;

wherein, the support arm is configured for attachment to the rear end of a railroad car and, when attached, for positioning at least one rotational member for contact with a rail of a train track and rotation by the train track when the car is moving; and the end of train device comprises an electrical coupling between the generator and the battery to charge a battery.

2. The end of train device of claim 1, wherein the at least one rotational member is coupled to the generator by one or more gears or by a pulley and belt.

3. The end of train device of claim 1 wherein the at least rotational member is comprised of two rotational members supported for rotation by a transverse member, the support arm positioning each of the two rotational members in contact with different rails of the train track.

4. The end of train device of claim 1, wherein the generator is capable of producing an amount of power while the train is moving that is equal to or greater than an amount of power consumed by the EOT device during operation of its electronic components.

5. The end of train device of claim 1, wherein the arm is configured for connection with the train car.

6. The end of train device of claim 5, wherein the arm is configured for connection to a train car coupler.

7. The end of train device of claim 1, where in the arm is coupled with and supported by the enclosure of the EOT.

8. The end of train device of claim 1, wherein the enclosure is configured for coupling to a train coupler.

9. A method of powering an end of train (EOT) device, comprising:

removably mounting an EOT device to a rear of a last car of a train, the EOT device comprising, an enclosure in which end of train electronic components are housed, wherein the electronic components include at least one train monitoring system, a wireless communication device enabling the end of train device to send information wirelessly to a head of train device, at least one battery for powering the at least the electronic components; and a subassembly comprising an electrical generator and at least one rotational member coupled to an input of the electrical generator to rotate the electrical generator when the at least one rotational member is rotated and thereby generate an electrical current that is supplied to the enclosure; and positioning the at least one rotational member on one of two rails of a track on which the train is located to cause rotation of the at least one rotational member in response to movement of the train car, thereby rotating the input of the electrical generator to generate electrical current.

10. The method of claim 9, wherein the last train car includes a train coupler extending from the rear of the train car and removably mounting the EOT device comprises connecting the enclosure to the train coupler.

11. The method of claim 10, wherein the EOT device further comprises a support arm on which the at least one rotational member is supported to position the at least rotational member on one of two rails of a track.

12. The method of claim 11, wherein the generator is mounted in the support arm.

13. The method of claim 11, wherein the support arm is connected to the enclosure.

14. The method of claim 11, further comprising removably connecting the support arm to the train coupler.

15. The method of claim 9, wherein the subassembly comprises a support arm on which the generator and the at least one rotational member is supported to position the at least rotational member on one of two rails of a track and wherein removably mounting the EOT device comprises connecting the support arm to a train coupler extending from the rear of the last car.

16. The method of claim 15, wherein the enclosure is mounted on and supported by the subassembly.

17. The method of claim 9, wherein the at least one rotational member comprises two rotational members connected by a transverse member and positioning comprises placing the two rotational members into contact with the two rails of the track.

18. The method of claim 17, wherein the EOT device further comprises a support arm on which the two rotational members are supported to position them on the two rails of the track.

19. The method of claim 9, further comprising supplying to the EOT device electrical current from the electric generator during a train trip an amount of electric energy equal to or greater than the amount of energy consumed operation of the electronic components during the train trip.

20. An end of train (EOT) device comprising:

an enclosure in which end of train electronic components are housed, the electronic components including at least one train monitoring system and a wireless communication device enabling the end of train device to send information wirelessly to a head of train device;

a subassembly comprising a support arm, an electrical generator, and at least one rotational member coupled to an input of the electrical generator to rotate the electrical generator when the at least one rotational member is rotated and thereby generate an electrical current; and a mounting system comprising at least one adapter for enabling attachment and detachment of the of the EOT device to a rear end of a railroad car and positioning, when the EOT device attached to the rear end of the railroad car, the support arm rearward of the rear end of the railroad card with the at least one rotational member in contact with a rail of a train track for rotation by the train track when the railroad car is moving.

\* \* \* \* \*